Aug. 4, 1953
L. C. WEATHERS
2,648,045
POWER TRANSMISSION
Filed March 22, 1948
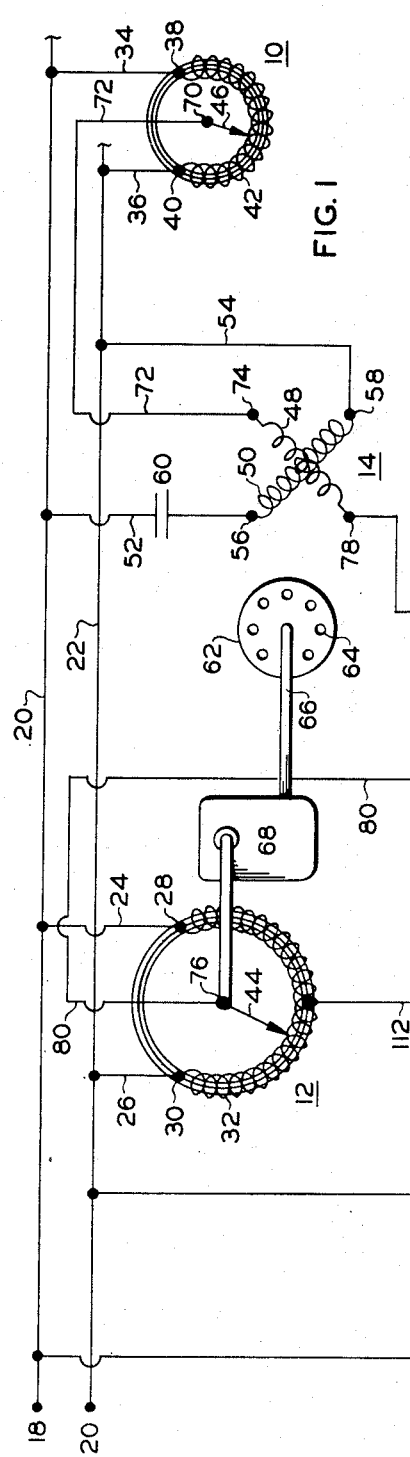
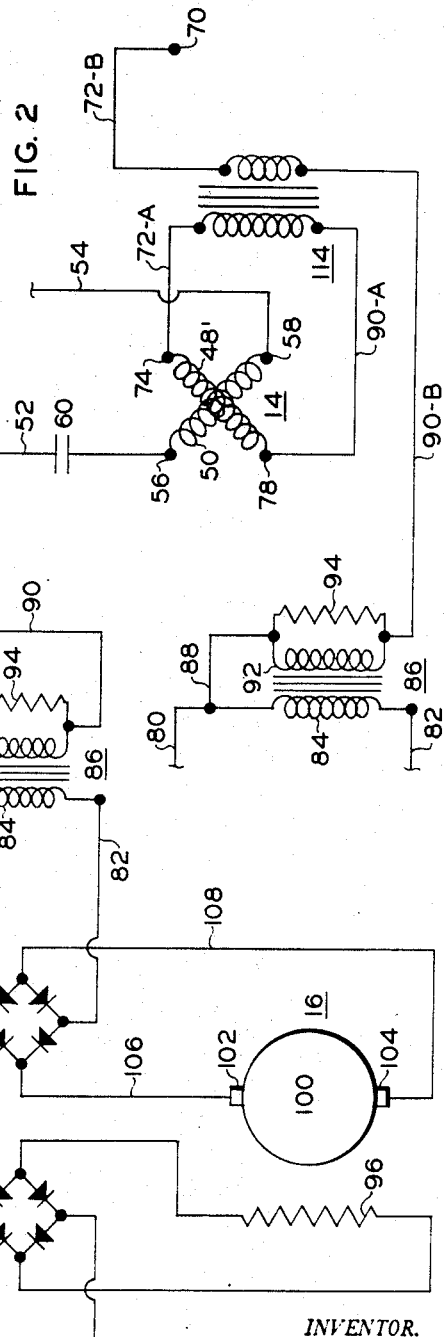
INVENTOR.
LELAND C. WEATHERS
BY
*Ralph L. Tweedale*
ATTORNEY Patented Aug. 4, 1953

2,648,045

UNITED STATES PATENT OFFICE 2,648,045

POWER TRANSMISSION

Leland C. Weathers, Detroit, Mich., assignor to Vickers Incorporated, Detroit, Mich., a corporation of Michigan Application March 22, 1948, Serial No. 16,240

12 Claims. (Cl. 323—47)

This invention relates to control systems, and more particularly to a system for remotely controlling an electrical load circuit.

In the past, numerous methods have been developed for controlling the voltage impressed on a load circuit, one of which utilizes an adjustable transformer. This invention also utilizes an adjustable transformer for controlling a load circuit, but provides novel means for remotely controlling the transformer. The novel means comprises a telemetric system in which an adjustable transformer is incorporated as one of the elements of the system in such a manner that the transformer performs the dual function of controlling the voltage impressed on the load circuit, and also as one of the controlling elements in the telemetric system. The invention, in its preferred form, utilizes an electric motor for adjusting the voltage output of the transformer. By providing a remotely located adjustable transmitter transformer and a telemetric circuit connecting both transformers to the motor for controlling the latter, the load circuit transformer performs the dual function previously mentioned.

The system is particularly adaptable for installations demanding that a heavy load be controlled at a remote point by a slight force.

Means are also provided in the system for automatically compensating for increases and decreases of load. Thus, the system is adaptable for controlling at a remote point either a constant or a variable load by selective impression on the load circuit of desired voltages and also automatically compensating for any increases or decreases of the load.

For example, the speed of an electric motor driving a load device may be increased or decreased by selective control at a remote point, and where the load on the motor varies the system, will automatically compensate for the variance by varying the voltage impressed on the load circuit.

It is therefore an object of this invention to provide an improved system for remotely controlling an electrical load circuit.

It is also an object of this invention to provide an improved telemetric system for remotely controlling an electrical load circuit.

It is another object of this invention to provide an improved system for automatically adjusting the voltage impressed on a load circuit in response to increases and decreases of load.

It is still another object of this invention to provide a system which may provide both remote control and automatic voltage compensation for an electrical load circuit.

It is a further object of this invention to provide a system for the purposes aforementioned which may incorporate economical and efficient mechanisms leading to low cost installation, and which will perform over a long and useful life.

Further objects and advantages of the present invention will be apparent from the following description, reference being had to the accompanying drawing wherein a preferred form of the present invention is clearly shown.

In the drawing:

Figure 1 is a diagrammatical view embodying a preferred form of the present invention.

Figure 2 is a partial diagrammatical view illustrating a slightly different form of the present invention.

Referring now to Figure 1, there is shown a remote control and automatic voltage compensation system comprising a pair of transformers 10 and 12 which are connected in parallel with an electric motor 14, and with a load circuit indicated generally by the numeral 16. The transformers 10 and 12 are of the well known continuously adjustable voltage output type, each of which is provided with a coil winding which is tapped by a movable brush.

A suitable supply source of single phase alternating current, the terminals of which are indicated by the numerals 18 and 20, is connected by means of main conductors 20 and 22 and branch conductors 24 and 26 to the terminals 28 and 30 of the receiver coil winding 32. Branch conductors 34 and 36, connected to the main conductors 20 and 22, connect the supply source to terminals 38 and 40 of the transformer coil winding 42. The coil winding 32 of the receiver 12 is tapped by a rotatable brush 44 actuated by the motor 14 while the coil winding 42 of the transmitter 10 is tapped by a rotatable brush 46, which in the form of the invention shown, is manually operated.

The motor 14 for actuating the receiver brush tap is preferably of the alternating current, two phase induction type, the stator of which includes a low voltage control winding indicated by the numeral 48 and a high voltage continuously excited field winding indicated by the numeral 50, the windings being 90° apart in space. The main supply conductors 20 and 22 are connected by means of branch conductors 52 and 54, respectively, to terminals 56 and 58 of the control winding 50 for continuously exciting the latter.

A suitable condenser 60 is incorporated in the branch conductor 52 in series with the field winding 50 of the motor 14 which converts the single phase alternating current supply to a two phase supply circuit in the well known manner. The rotor of the motor 14 is indicated by the numeral 62 and the rotor bar windings by the numeral 64. The output shaft 66 of the motor 14 is shown connected to the brush 44 of the receiver 32 by a suitable reduction gearing box indicated generally by the numeral 68.

The motor 14 is adapted to be operated and stopped, respectively, by a differential and equalized voltage impressed across the control winding 48. By connecting the transmitter output to one end of the control winding and the receiver output to the opposite end thereof, the receiver output voltage may be adjusted remotely by the transmitter. It follows that by connecting the receiver output to the load circuit, the voltage impressed on the load circuit may be remotely controlled by the transmitter. For this purpose, the output terminal 70 of the transmitter brush 46 is connected by a conductor 72 to one terminal 74 of the motor control winding 48. The output terminal 76 of the receiver brush 44 is connected by a circuit, a description of which immediately follows, to the opposite terminal 78 of the motor control winding 48, and also to the load circuit 16. The above mentioned circuit comprises conductors 80 and 82 connecting the output terminal 76 of the receiver 32 to the load circuit 16 across the primary winding 84 of a transformer 86, and the conductor 80 and conductors 88 and 90, connecting the output terminal 76 of the receiver 32 to the remaining terminal 78 of the control winding 50 across a secondary winding 92 of the transformer 86. A resistor 94 is connected across the secondary winding 92 of the transformer 86. The transformer 86, with the resistor 94 connected across the secondary winding 92 thereof, constitutes an impedance in the circuit which compensates for increases and decreases of load on the load circuit. The changes of load are reflected across the impedance for operating the motor 14 to adjust the receiver voltage delivery output impressed on the load circuit.

For the purposes of convenience, the load circuit has been illustrated as comprising a separately excited direct current motor which is adapted to drive a load, not shown, which may be constant or variable. It should be understood, however, that the system is applicable for control of many load circuits where the voltage impressed on the load circuit is desired to be controlled remotely or when automatic compensation for increases and decreases of load on the load circuit is desired. One example of such a load circuit would be the control of a plurality of lights used in an auditorium lighting system.

The motor illustrated includes a separately excited field winding 96, the opposite ends of which are connected to the rectifier 98, the latter of which is connected to the conductors 20 and 22. An armature 100 of the motor is connected by means of brushes 102 and 104 and conductors 106 and 108 to a rectifier 110. The rectifier 110 is connected to the A. C. supply source by means of a conductor 112 which is center tapped to the receiver winding 32. The rectifiers 98 and 110 convert the A. C. supply source to direct current in the well known manner.

With the motor in the load circuit operating, with no load impressed thereon, and the transmitter and receiver brushes in the position shown, the motor 14 is stopped. With no load impressed on the load circuit motor, substantially no current will be induced in the secondary winding 92 of the transformer 86, and as the voltage output of the transmitter and receiver are equal, no difference in potential exists across the control winding 48 of the motor 14 so that the motor 14 remains stopped. However, when the motor is loaded to its full torque rating, a current will be induced across the secondary winding 92 of the transformer 86, which because of flow through the resistor 94 causes a voltage drop across the resistor 94. Due to the fact that the resistor 94 is in series with one end of the control winding 48, the control winding circuit becomes unbalanced, that is, a difference in voltage is impressed across the control winding 48 of the motor 14, operating the same. With the motor 14 in operation, the reduction gear linkage 68 will rotate the receiver brush 44. When the receiver brush 44 has been rotated so that the voltage output of the receiver 12, minus the voltage drop across the resistor 94, equalizes the voltage impressed at the opposite end of the control winding 48 of motor 14, the latter will stop. During the operation of the motor 14, the voltage output of the receiver 12 has increased. Therefore, the tendency of the load impressed upon the motor in the load circuit 16 to decrease the speed of the motor, is overcome by the increased voltage output of the receiver in order to maintain the speed of the motor constant.

Assuming that the load impressed on the load circuit motor remains constant, if it is desired to vary the speed of the motor, the transmitter brush 46 may be manually adjusted to secure the speed desired. Thus, if the transmitter brush 46 is adjusted to increase the voltage output of the transmitter, the voltages impressed across the control winding 48 of the motor 14 become unbalanced, and the motor 14 is operated to adjust the voltage output of the receiver. When the voltage output of the receiver minus the voltage drop across the resistor 94 has been adjusted so that the voltages impressed across the control winding of the motor 14 are equalized, the control winding is in effect shorted and the motor 14 stops.

The motor 14 operation is as follows:

The field winding 50 of the motor 14 is continually excited by the current in conductors 20 and 52 connected to the terminal 56, and the current in the conductors 22 and 54 connected to the opposite terminal 58. As previously stated, when a differential voltage is impressed across the control winding 48, a current is caused to flow therein and the armature will rotate. When the voltages impressed at opposite ends of the control winding 48 are equal, the control winding is in effect shorted so that the armature 62 will not only fail to revolve, but will even exert torque to maintain its position at standstill. This torque is sufficient to cause the motor, when running at full speed, to snap to a stop when the control winding is in effect shorted. The motor 14, as shown in Figure 1, is provided with a high voltage field winding because of being connected directly to the high voltage source and as having a low voltage control winding to obtain good sensitivity from the voltage output of the transmitter and the receiver. However, it is possible to use a two phase induction motor having field and control windings of the same strength as illustrated in Figure 2. This may be done by incorporating a step-up transformer indicated by the numeral 114, having the proper ratio of primary to secondary winding strength, and having its primary connected to the output terminal of the transmitter and to the load circuit by conductors 72B and 90B of its secondary connected across the control winding 48' of the motor 14 by conductors 72A and 90A.

It can be clearly seen that in order to secure a fine degree of sensitivity that the control winding is constructed of a strength relative to the output voltages of the transmitter and receiver when used without the transformer 114, as shown in Figure 1, or it may be constructed of the same strength as the field winding when used in connection with a step-up transformer 114, as shown in Figure 2.

By adjusting the transmitter brush 46 in the opposite direction, the voltage output of the transmitter is increased, again unbalancing the voltages impressed across the control winding of the motor 14. In this case, the armature 64 of the motor 14 rotates in the opposite direction to decrease the voltage output of the receiver 32 until the voltage output of the receiver minus the voltage drop across the resistor 94 balances the voltage output of the transmitter.

The system also automatically compensates for any increases or decreases of load on the load circuit 16. Assuming that the transmitter brush 46 has been set to deliver a constant voltage output, any increase or decrease in load on the motor armature 100 immediately respectively increases or decreases the current of the armature 100, and consequently changes the voltage drop across the resistor 94. The increased or decreased voltage drop across the resistor 94 unbalances the circuit and the motor 14 will run until the voltage across the resistor and the potential between the transmitter and receiver brushes are equal.

In addition, with a varying load impressed on the load circuit 16, the speed of this varying load may be remotely controlled by adjusting the transmitter. The transmitter 10 may be adjusted to unbalance the voltage impressed across the control winding of the motor 14 to increase or decrease the speed of the motor armature 100, and when the transmitter has been adjusted for a certain speed of the motor, if the load varies, this variance of load is reflected across the resistor to change the voltage drop thereacross, and unbalance the voltages impressed across the control winding 48 of the motor 14.

Thus, there is shown, first, a means of remotely varying the voltage impressed in the load circuit 16 by a simple manual adjustment of the transmitter 10. Secondly, providing the transmitter 10 is set to deliver a constant voltage output, a means of automatically compensating for variances of load in the load circuit by varying the voltage output of the receiver, and third, a combination of the two stated means whereby the varying load may be adjusted in speed and variances in load automatically compensated by variances in voltage impressed on the load circuit.

While the form of embodiment of the invention as herein disclosed constitutes a preferred form, it is to be understood that other forms might be adopted, all coming within the scope of the claims which follow.

What is claimed is as follows:

1. A control system comprising in combination a load circuit, a voltage adjuster for the load circuit, an electric motor for operating the voltage adjuster, a remote transmitter selectively operable to various positions, a control circuit connecting the motor, the voltage adjuster and the transmitter to cause the motor to operate the voltage adjuster under the combined control of the voltage adjuster and the transmitter, and load responsive means for affecting the motor in response to changes of load.

2. A system for automatically varying the voltage impressed on a load circuit in response to variances of load thereon comprising in combination a source of current, a load circuit, a transformer connected to the source and the circuit for adjusting the voltage impressed on the circuit, an electric motor for operating the transformer, a second transformer connected to the source, a circuit connecting the transformers to the motor to cause the motor to operate the first transformer under the combined control of both transformers, and load responsive means in the circuit for affecting the motor in response to changes of load.

3. A control system for remotely controlling a load circuit and for automatically varying the voltage impressed on the circuit in response to variances of load thereon comprising in combination a source of current, a load circuit, an adjustable receiver transformer connected to the source and the load circuit, an electric motor for operating the receiver transformer to adjust the voltage output thereof, a transmitter transformer connected to the source and selectively operable to various voltage output positions, a control circuit connecting the transformers to the motor to cause the motor to operate the receiver transformer under the combined control of the transformers, and means in the circuit responsive to changes of load for effecting operation of the motor.

4. A control system for remotely controlling a load circuit and for automatically varying the voltage impressed on the circuit in response to variances of load thereon comprising in combination a source of current, a load circuit, an adjustable receiver transformer connected to the source and the load circuit, an electric motor for operating the receiver transformer to adjust the voltage output thereof, said motor including a continuously excited field winding and a control winding and being of the type which is actuated and stopped, respectively, by differential and equalized voltages impressed across the control winding thereof, a transmitter transformer connected to the source and selectively operable to various voltage output positions, a control circuit connecting the transformers to the control winding of the motor to cause the motor to operate the receiver transformer under the combined control of the transformers, and means in the circuit responsive to changes of load for effecting operation of the motor.

5. A system for automatically varying the voltage impressed on a load circuit in response to variances of load thereon comprising in combination a source of current, a load circuit, an adjustable transformer connected to the source and the load circuit, an electric motor for operating the transformer to adjust the voltage output thereof, said motor including a continuously excited field winding and a control winding across the latter of which differential and equalized voltage may be impressed for respectively actuating and stopping the motor, a second transformer connected to the source, a circuit connecting the transformers across the control winding of the motor to cause the motor to operate the load circuit transformer and load responsive means in the circuit for affecting the control winding of the motor in response to changes of load.

6. A system for remotely controlling a load circuit and for automatically varying the voltage impressed on the circuit in response to the variation of the load thereon comprising in combination a source of current, a load circuit, a transformer connected to the source and the circuit for adjusting the voltage impressed on the circuit, an electric motor for operating the transformer, a second transformer connected to the source, means connected in series with the motor for modifying the potentials applied to the motor, said last means being responsive to variations in said load, and a circuit connecting the transformers to the motor and said means to cause the motor to operate the first transformer under the combined control of both transformers and said means.

7. A control system for remotely controlling a load circuit and for automatically varying the voltage impressed on the circuit in response to the variation of the load thereon comprising in combination a source of current, a load circuit, an adjustable receiver transformer connected to the source and load circuit for supplying current to the load circuit, an electric motor for operating the receiver transformer to adjust the output thereof, said motor including a continuously excited field winding and a control winding across the latter of which differential and equal voltages may be impressed for respectively actuating and stopping the motor, an adjustable transmitter transformer connected to the source, said motor control winding being connected between said transformers, and means coupled to said control winding for modifying the potentials applied to the control winding by said transformers, said means being operable in response to currents proportional to the load, thereby to cause the actuation and stopping of the motor under the combined control of both transformers and said means.

8. A control system for remotely controlling a load circuit and for automatically varying the voltage impressed on the circuit in response to the variation of the load thereon comprising in combination a source of alternating current, a load circuit, an adjustable receiver transformer connected to the source and the load circuit for supplying current to the load circuit, an electric motor for operating the receiver transformer to adjust the output thereof, said motor including a continuously excited field winding and a control winding across the latter of which differential and equal voltages may be impressed for respectively actuating and stopping the motor, a transmitter transformer connected to the source, said motor control winding being connected between outputs of said transformers, and means coupled to said control winding for modifying the potentials applied to the control winding by said transformers, said means being operable in response to currents proportional to the load and comprising a transformer having a first and second winding, the first winding having an impedance shunted thereacross, and also being connected in series with the control winding of the motor, said second transformer winding being connected in series with the load, whereby the receiver transformer may be adjusted by the actuation and stopping of the motor under the combined control of the receiver transformer, the transmitter transformer, and said means.

9. A control system comprising in combination a load circuit, terminals for receiving supply current, a voltage adjuster for the load circuit, an electric motor for operating the voltage adjuster, a remote transmitter selectively operable to various positions, the voltage adjuster and transmitter being connected to said terminals, a control circuit connecting the motor, the voltage adjuster and the transmitter to cause the motor to operate the voltage adjuster under the combined control of the voltage adjuster and the transmitter, and load responsive means for affecting the motor in response to changes of load.

10. A system for automatically varying the voltage impressed on a load circuit in response to variances of load thereon comprising in combination terminals for receiving supply current, a load circuit, a transformer connected to said terminals and the circuit for adjusting the voltage impressed on the circuit, an electric motor for operating the transformer, a second transformer connected to said terminals, a control circuit connecting the transformers to the motor to cause the motor to operate the first transformer under the combined control of both transformers, and load responsive means in the control circuit for affecting the motor in response to changes of load.

11. A control system comprising in combination a load circuit, a voltage adjuster for the load circuit, an electric motor for operating the voltage adjuster, a remote transmitter, a control circuit connecting the motor, the voltage adjuster and the transmitter to cause the motor to operate the voltage adjuster under the combined control of the voltage adjuster and the transmitter, and load responsive means for affecting the motor in response to changes of load.

12. A system for automatically varying the voltage impressed on a load circuit in response to variances of load thereon comprising in combination a load circuit, an adjustable transformer connected to the circuit for adjusting the voltage impressed on the circuit, an electric motor for adjusting the transformer, a second transformer, a control circuit connecting the transformers to the motor to cause the motor to adjust the first transformer under the combined control of both transformers, and load responsive means in the control circuit for affecting the motor in response to changes of load.

LELAND C. WEATHERS.

References Cited in the file of this patent

UNITED STATES PATENTS

| Number | Name | Date |
| --- | --- | --- |
| 1,086,729 | Rey | Feb. 10, 1914 |
| 2,061,410 | Stablein | Nov. 17, 1936 |
| 2,137,877 | Kramer | Nov. 22, 1938 |
| 2,225,994 | Hunter | Dec. 24, 1940 |
| 2,277,652 | Evans | Mar. 24, 1942 |
| 2,406,221 | Hornfeck | Aug. 20, 1946 |
| 2,432,772 | Lear | Dec. 16, 1947 |
| 2,452,784 | Noodleman | Nov. 2, 1948 |